United States Patent
Kommula et al.

(10) Patent No.: US 11,190,440 B2
(45) Date of Patent: Nov. 30, 2021

(54) METHODS AND APPARATUS TO CONFIGURE AND MANAGE NETWORK RESOURCES FOR USE IN NETWORK-BASED COMPUTING

(71) Applicant: VMware, Inc., Palo Alto, CA (US)

(72) Inventors: Raja Kommula, Cupertino, CA (US); Raj Yavatkar, Saratoga, CA (US); Thayumanavan Sridhar, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/875,744

(22) Filed: Jan. 19, 2018

(65) Prior Publication Data
US 2019/0230025 A1    Jul. 25, 2019

(51) Int. Cl.
*H04L 12/709* (2013.01)
*H04L 12/751* (2013.01)
*H04L 12/26* (2006.01)
*H04L 12/24* (2006.01)

(52) U.S. Cl.
CPC ........ *H04L 45/245* (2013.01); *H04L 41/0893* (2013.01); *H04L 41/12* (2013.01);
(Continued)

(58) Field of Classification Search
CPC ... H04L 45/245; H04L 45/02; H04L 41/0893; H04L 41/12; H04L 43/0876; H04L 41/0896; H04L 43/16; H04L 69/22; H04L 67/10; H04L 67/2833; H04L 12/4633; H04L 67/2814; H04L 2212/00; H04L 41/0876; H04L 41/0886; H04L 49/10; H04L 45/122; H04L 45/125; H04L 12/6418; H04L 45/38; H04L 49/15; H04L 47/125; H04L 43/10; H04L 49/201; H04L 45/026; H04L 45/586; H04L 41/0659; H04L 41/0681; H04L 41/0816; H04L 41/0233; H04L 41/082; H04L 45/46; H04L 12/4641; H04L 41/0869; H04L 49/253; H04L 49/354; H04L 41/0803;
(Continued)

(56) References Cited

U.S. PATENT DOCUMENTS

2003/0112810 A1   6/2003  Nakabayashi et al.
2004/0024906 A1   2/2004  Valdevit et al.
(Continued)

*Primary Examiner* — Hardikkumar D Patel
(74) *Attorney, Agent, or Firm* — Hanley, Flight & Zimmerman, LLC

(57) ABSTRACT

An example apparatus to manage network resources includes a link aggregator to: aggregate a first plurality of physical network interface cards to create a first link aggregated group, the first link aggregated group corresponding to a first virtual network interface card; and aggregate a second plurality of physical network interface cards to create a second link aggregated group, the second link aggregated group corresponding to a second virtual network interface card; and a link manager to: connect the first link aggregated group between a first distributed virtual port and a first top-of-rack switch; connect the second link aggregated group between a second distributed virtual port and a second top-of-rack switch; and remove an invalid connection between the first plurality of physical network interface cards and the second top-of-rack switch.

36 Claims, 9 Drawing Sheets

LBT OVER LAG NETWORK CONFIGURATION

(52) U.S. Cl.
CPC .......... *H04L 43/0876* (2013.01); *H04L 45/02* (2013.01); *H04L 41/0896* (2013.01); *H04L 43/16* (2013.01)

(58) Field of Classification Search
CPC ..... H04L 69/03; H04L 12/66; H04L 41/0668; H04L 41/0806; H04L 69/324; H04L 41/0813; H04L 45/28; H04L 43/065; H04L 2012/5652; Y02D 30/50
See application file for complete search history.

(56) References Cited

U.S. PATENT DOCUMENTS

| | | | |
|---|---|---|---|
| 2009/0046583 A1 | 2/2009 | Towster et al. | |
| 2009/0073894 A1 | 3/2009 | Nimon et al. | |
| 2010/0008351 A1* | 1/2010 | Ashwood-Smith | H04J 3/0661 370/350 |
| 2012/0179922 A1* | 7/2012 | Mehrotra | G06F 1/3278 713/300 |
| 2014/0313932 A1* | 10/2014 | Saltsidis | H04L 41/0668 370/254 |
| 2014/0355477 A1* | 12/2014 | Velayudhan | H04L 41/0806 370/254 |
| 2015/0172210 A1 | 6/2015 | Sarkar et al. | |
| 2016/0197824 A1* | 7/2016 | Lin | H04L 45/38 370/389 |
| 2016/0197853 A1* | 7/2016 | Kumar | H04L 43/10 370/389 |
| 2017/0264490 A1* | 9/2017 | Kunda | H04L 41/0876 |
| 2018/0176036 A1* | 6/2018 | Butcher | H04L 69/22 |
| 2018/0367981 A1 | 12/2018 | Desai et al. | |

* cited by examiner

METHODS AND APPARATUS TO CONFIGURE AND MANAGE NETWORK RESOURCES FOR USE IN NETWORK-BASED COMPUTING

FIELD OF THE DISCLOSURE

The present disclosure relates generally to network-based computing and, more particularly, to methods and apparatus to configure and manage network resources for use in network-based computing.

BACKGROUND

Virtualizing computer systems provides benefits such as the ability to execute multiple computer systems on a single hardware computer, replicating computer systems, moving computer systems among multiple hardware computers, and so forth. "Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may be composed of many processing units (e.g., servers). The processing units may be installed in standardized frames, known as racks, which provide efficient use of floor space by allowing the processing units to be stacked vertically. The racks may additionally include other components of a cloud computing environment such as storage devices, networking devices (e.g., switches), etc.

Figure 1:
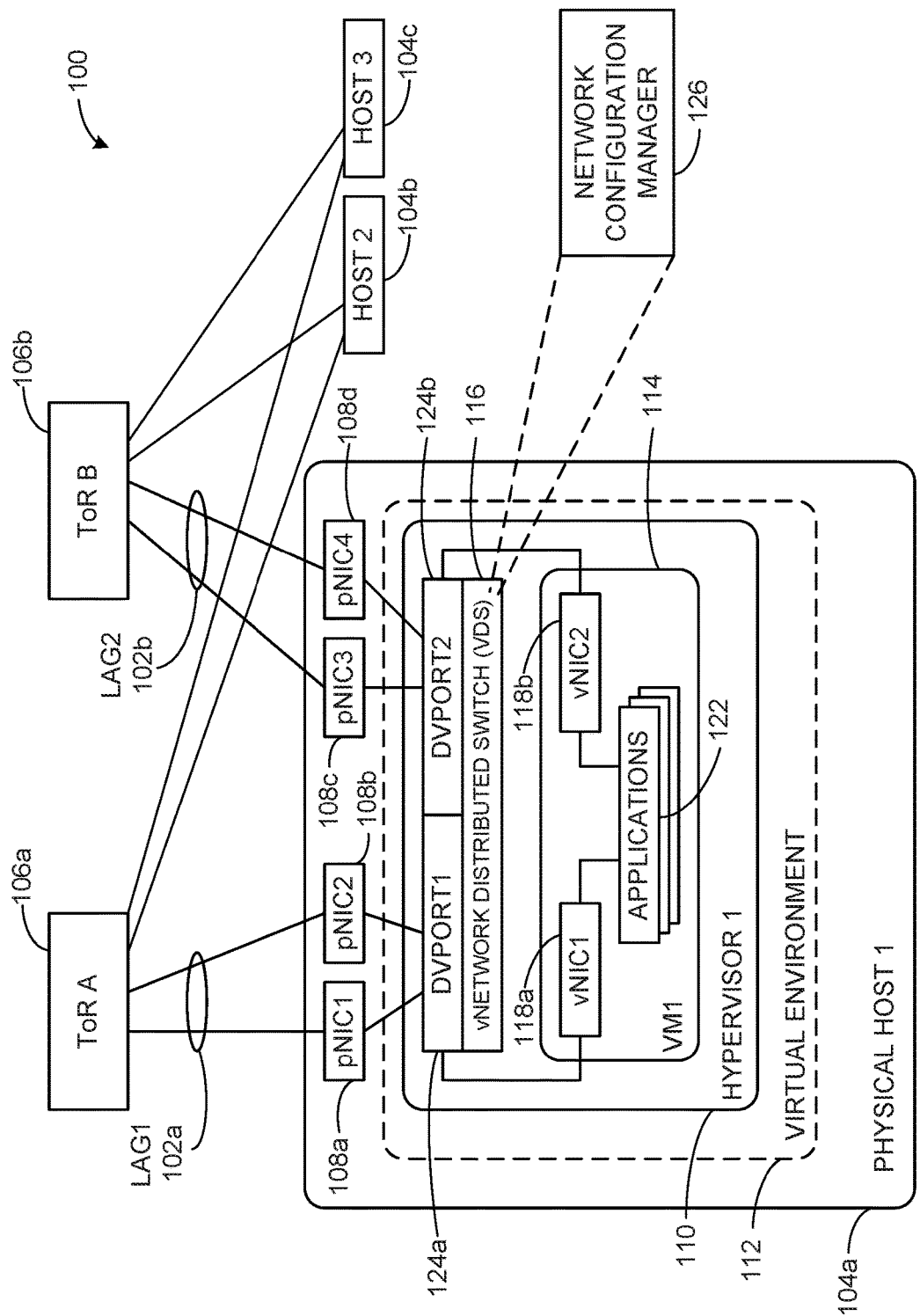
FIG. 1 is an example network configuration for use in a software defined data center (SDDC) based on implementing a load based teaming (LBT) load balancing policy over a link aggregation group (LAG) policy.

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Network-based computing such as cloud computing is based on the deployment of many physical resources across a network, virtualizing the physical resources into virtual resources, and provisioning the virtual resources in software defined data centers (SDDCs) for use across cloud computing services and applications. Examples disclosed herein may be used to manage network resources in SDDCs to improve performance and efficiencies of network communications between different virtual and/or physical resources of the SDDCs. Examples disclosed herein may be used in connection with different types of SDDCs. In some examples, techniques disclosed herein are useful for managing network resources that are provided in SDDCs based on Hyper-Converged Infrastructure (HCI). In examples disclosed herein, HCI combines a virtualization platform such as a hypervisor, virtualized software-defined storage, and virtualized networking in an SDDC deployment. An SDDC manager can provide automation of workflows for lifecycle management and operations of a self-contained private cloud instance. Such an instance may span multiple racks of servers connected via a leaf-spine network topology and connects to the rest of the enterprise network for north-south connectivity via well-defined points of attachment.

Examples disclosed herein may be used with one or more different types of virtualization environments. Three example types of virtualization environment are: full virtualization, paravirtualization, and operating system (OS) virtualization. Full virtualization, as used herein, is a virtualization environment in which hardware resources are managed by a hypervisor to provide virtual hardware resources to a virtual machine (VM). In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical random-access memory (RAM) with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). The isolation of the processes is known as a container. Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and an OS virtualization environment. In such a data center, a workload may be deployed to any of the virtualization environments. Through techniques to monitor both physical and virtual infrastructure, examples disclosed herein provide visibility into the virtual infrastructure (e.g., VMs, virtual storage, virtual networks and their control/management counterparts) and the physical infrastructure (servers, physical storage, network switches).

Figure 2:
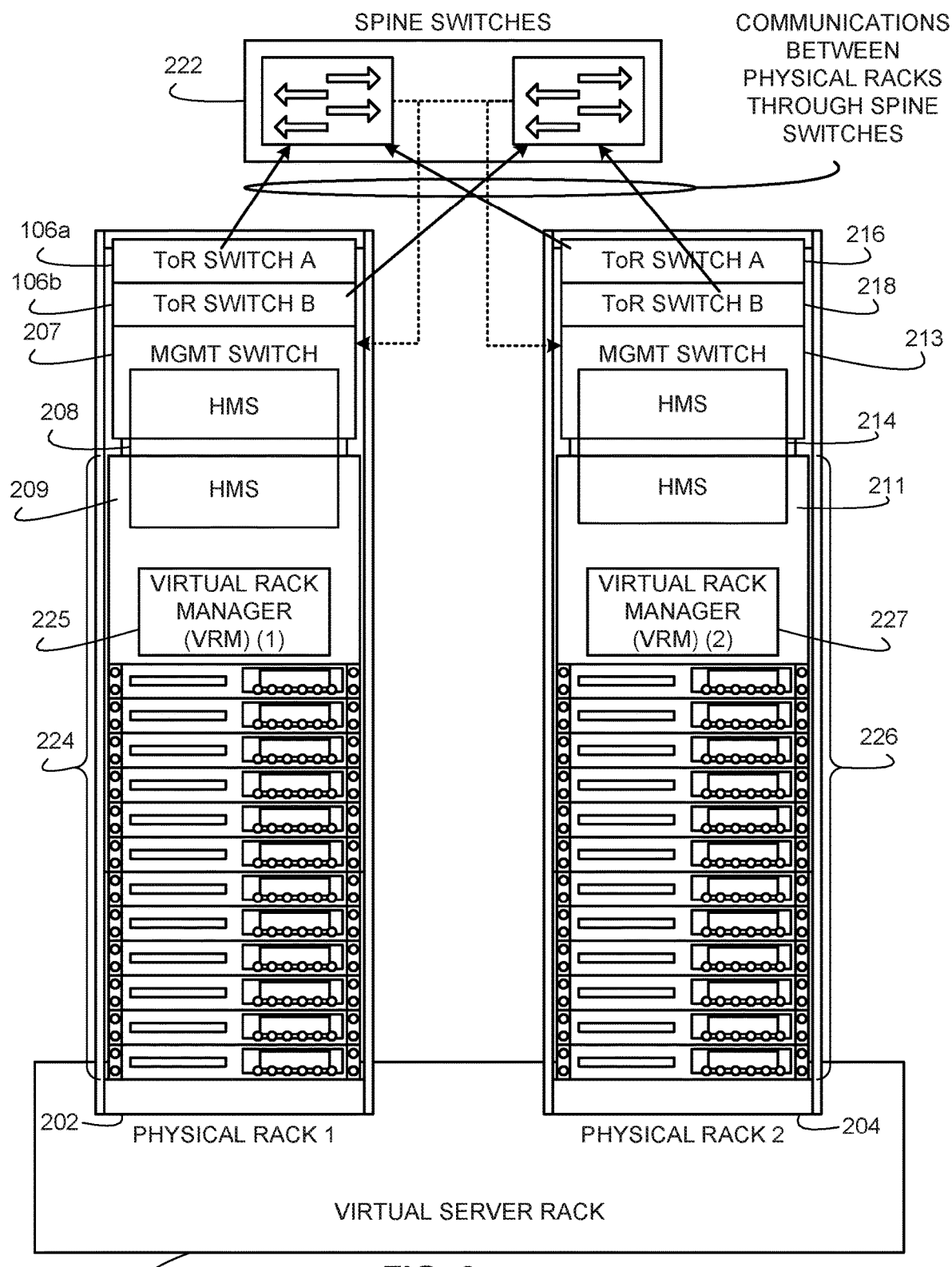
FIG. 2 depicts example physical racks in an example virtual server rack deployment in which LBT over LAG network topologies may be implemented in accordance with teachings of this disclosure.

Examples disclosed herein employ such monitoring of virtual and physical infrastructures to create and manage network configurations based on load balancing groups of aggregated network links between physical network switches (e.g., the top-of-rack (ToR) switches 106a, 106b, 216, 218 of FIG. 2) and distributed virtual ports (dvports) of virtual network distributed switches. Examples disclosed herein are described as employing a Load-Based Teaming (LBT) policy for load balancing, and a Link Aggregation Group (LAG) method for aggregating physical network interface cards (pNICs) into link aggregation groups (LAGs). Examples disclosed herein enable using both LBT policies and LAG methods together to increase availability and throughput of network resources and overcome problems associated with prior implementations that require using LBT policies and LAG methods in mutually exclusive manners.

LBT, also known as "route based on physical NIC load," is a load balancing network protocol used to load balance network traffic between different pNICs based on link utilizations of active pNICs. When a request for a network connection is made by an application to communicate over a network, a dvport is created and/or allocated to the requesting application and is bound to a pNIC. In this manner, the pNIC is the physical network resource that serves the dvport. Subsequent requests for network connections result in additional dvports being created and bound to the pNIC. Prior uses of LBT involve binding a dvport to a single pNIC. According to such prior LBT uses, when the utilization of the pNIC exceeds 75% of the total network traffic capacity of the pNIC, one or more dvports assigned to the pNIC is/are moved to a different, less utilized pNIC. Thus, prior uses of LBT initially select only one pNIC for all outgoing traffic of a dvport, and multiple created/allocated dvports must share the single pNIC until the 75% utilization threshold is exceeded for that pNIC. Only after the 75% utilization threshold is exceeded does the prior LBT implementation move one or more dvports onto a less utilized pNIC so that none of the active pNICs exceeds the 75% utilization threshold. Based on such prior uses of LBT, additional pNICs in a host server can remain underutilized while applications experience underperforming network throughput due to one active pNIC handling all the outgoing network traffic but not exceeding the 75% utilization threshold. In addition, because prior implementations of LBT assign a dvport to only a single pNIC, the maximum possible throughput of a single dvport is the total network traffic capacity of a single pNIC. For example, a physical host server having four 10 gigabit per second (Gbps) pNICs cannot be used by prior LBT implementations to provide more than 10 Gbps throughput for any single dvport because each dvport is assigned to only one pNIC under such prior LBT implementations.

LAG methods can be implemented using a link aggregation control protocol (LACP) to bundle multiple pNICs together into a LAG. A dvport can be bound to the LAG (and, thus, to multiple pNICs), and it is presented as a single virtual network interface card (vNIC) available for use by applications executing in a VM. In such LAG methods, different pNICs of a LAG can be connected to separate physical network switches (e.g., ToR switches 106a, 106b, 216, 218 of FIG. 2), and doing so enables creating high-available networks with redundant paths between any two hosts. Since multiple pNICs can be bundled together using LAG, a single dvport can achieve an effective throughput of all the pNICs' maximum capacities combined. Thus, a physical host server having four 10 Gbps pNICs can provide a single dvport with a maximum possible throughput of 40 Gbps bandwidth, if needed. However, prior implementations of LAG methods cannot be fully used by storage protocols that employ multi-path I/O (MPIO) (e.g., Internet Small Computer Systems Interface (iSCSI) and Network File System (NFS)). As such, the effective throughput of an MPIO-based storage device is limited to that of a single pNIC under such prior implementations of LAG methods.

In prior implementations of LBT policies and LAG methods, users/customers of virtualization services and administrators must select to implement only one of LBT or LAG. Once selected and implemented, it is impractical to switch between the two because of the significant overhead required to reconfigure cabling in the physical network. In prior implementations in which LBT is selected, performance of MPIO-based storage devices improves, but network throughput performance for other applications degrades because of a dvport being assignable to only a single pNIC. In prior implementations in which LAG is selected, network throughput performance for multiple applications improves because each dvport used by the applications can be assigned to multiple pNICs, but performance of MPIO-based storage devices does not improve because such MPIO-based storage devices cannot use multiple pNICs simultaneously. In addition, while prior implementations of LAG can gracefully tolerate failures of pNICs, prior implementations of LBT cannot.

Examples disclosed herein provide an example LBT over LAG network architecture that enables using both LBT policies and LAG methods simultaneously. Example LBT over LAG techniques disclosed herein can be used to dynamically create different LBT over LAG topologies to adjust for different network conditions. In such LBT over LAG topologies, attributes of the LAG method can be used to increase network throughput available from a single dvport by binding the single dvport to multiple pNICs. In this manner, LAG attributes can be leveraged to use the multiple pNICs simultaneously to serve the single dvport in a more effective manner than is possible using prior implementations of the LBT policy. In addition, attributes of the LBT policy can be used to load balance network traffic across multiple switches (e.g., ToR switches) by, for example, connecting a LAG assigned to multiple pNICs between a dvport and a switch (e.g., a ToR switch) that is different from another switch (e.g., another ToR switch) that is occupied by one or more other dvports. Using the example LBT over LAG network architecture disclosed herein, the LBT policy can also be used to establish a dvport assigned to a single pNIC so that load balancing attributes of the LBT policy can still be employed by MPIO-based storage devices that are only capable of communicating through one pNIC at a time.

FIG. 1 is a block diagram of an example LBT over LAG network configuration 100 based on an LBT over LAG network architecture for use in an SDDC. The example LBT over LAG network configuration 100 of FIG. 1 includes two separate LAGs indicated as example LAG1 102a and example LAG2 102b. The example LAG1 102a is connected between an example host 104a (e.g., a physical host server 1) and a first ToR switch A 106a. The example LAG2 102b is connected between the host 104a and a second ToR switch B 106b. In the illustrated example, the LAG1 102a includes a first aggregated group of physical network interface cards 108a,b of the host 104a, and the LAG2 102b includes a second aggregated group of physical network interface cards 108c,d of the host 104a. While the example LBT over LAG network configuration 100 uses a LAG method to connect the example LAGs 102a,b between the host 104a and corresponding ToR switches 106a,b as shown in FIG. 1, the example LBT over LAG network configuration 100 also uses an LBT policy as the load balancing policy to balance or distribute network load across the multiple ToR switches 106a,b. The example LBT over LAG network configuration 100 of FIG. 1 enables network communications between the host 104a and one or more other hosts 104b,c via the ToR switches 106a,b.

As used herein, the term "host" refers to a functionally indivisible unit of the physical hardware resources (e.g., the example physical hardware resources 224, 226 of FIG. 2), such as a physical server that is configured or allocated, as a whole, to a virtual rack and/or workload; powered on or off in its entirety; or may otherwise be considered a complete functional unit. In the illustrated example of FIG. 1, the host 104a executes an example hypervisor 110, which provides local virtualization services to create an example virtual environment 112 in the host 104a. The example hypervisor 110 may be implemented using any suitable hypervisor (e.g., VMWARE® ESX® hypervisor, Microsoft HYPER-V® hypervisor, and Kernel Based Virtual Machine (KVM)). In the illustrated example of FIG. 1, the hypervisor 110 executes an example VM 114 and an example virtual network (vnetwork) distributed switch (VDS) 116. The example VDS 116 functions as a single virtual switch that can be deployed in a single host and/or across multiple hosts. This enables setting network configurations that span across all the member hosts, and allows VMs to maintain consistent network configurations as they migrate across the multiple hosts. The example VM 114 of the illustrated example is configured to include multiple vNICs 118a,b for use by applications 122 executed by the VM 114 to perform network communications via a network. In the illustrated example of FIG. 1, the first aggregated group of physical network interface cards 108a,b corresponds to the first vNIC 118a of the VM 114, and the second aggregated group of physical network interface cards 108c,d corresponds to the second vNIC 118b of the VM 114.

In the illustrated example, the VDS 116 provides dvports 124a,b assignable to the vNICs 118a,b of the VM 114 to enable network communications between the applications 122 of the VM 114 and the ToR switches 106a,b. The dvports 124a,b of the illustrated example are assigned port numbers by the VDS 116 to identify a source/destination side of a connection that terminates at the hypervisor 110. The VDS 116 uses the port numbers of the dvports 124a,b to determine the vNICs 118a,b and the applications 122 to which network communications received via the LAGs 102a,b should be delivered.

In the illustrated example of FIG. 1, the VDS 116 monitors the connections between the host 104a and the ToR switches 106a,b and between the first ToR switch 106a and the second ToR switch 106b to confirm that the LBT over LAG network configuration 100 remains valid. For example, the VDS 116 may send probe messages into the LBT over LAG network configuration 100 to check for misconfigurations that render the LBT over LAG network configuration 100 invalid. In examples disclosed herein, validity of the LBT over LAG network configuration 100 is based on compliance with an LBT over LAG validity rule requiring that each LAG 102a,b connects the host 104a to only one of the ToR switches 106a,b, and that the ToR switches 106a,b be disjointed. Thus, the VDS 116 monitors for any single LAG 102a,b connecting the host 104a to multiple ToR switches 106a,b and for connections between the ToR switches 106a,b. If the VDS 116 detects either condition, the LBT over LAG network configuration 100 is regarded as being in an invalid state, and the VDS 116 performs a corrective action suitable to reconfigure the LBT over LAG network configuration 100 into a network configuration that is in a valid state. Invalid states and corrective actions taken to return different LBT over LAG network configurations to a valid state are described in more detail below in connection with FIG. 5.

Reconfiguring the LBT over LAG network configuration 100 into a valid state prevents routing errors that could arise from an invalid state such as routing loops in which packets are repeatedly routed to their source and/or between different network devices (e.g., switches, routers, etc.) in a looping fashion without being delivered to their destinations and/or taking an excessively significant amount of time to be delivered to their destinations. Example LBT over LAG network configurations can be made invalid based on a number of network misconfigurations that violate the LBT over LAG validity rule discussed above. In some examples, the network misconfigurations are logical misconfigurations (e.g., a LAG connecting a host to multiple ToR switches). In other examples, the network misconfigurations are physical misconfigurations such as an administrator changing cables or adding cables (e.g., physically connecting the ToR switches 106a,b to one another) that render a LBT over LAG network topology invalid.

Figure 3:
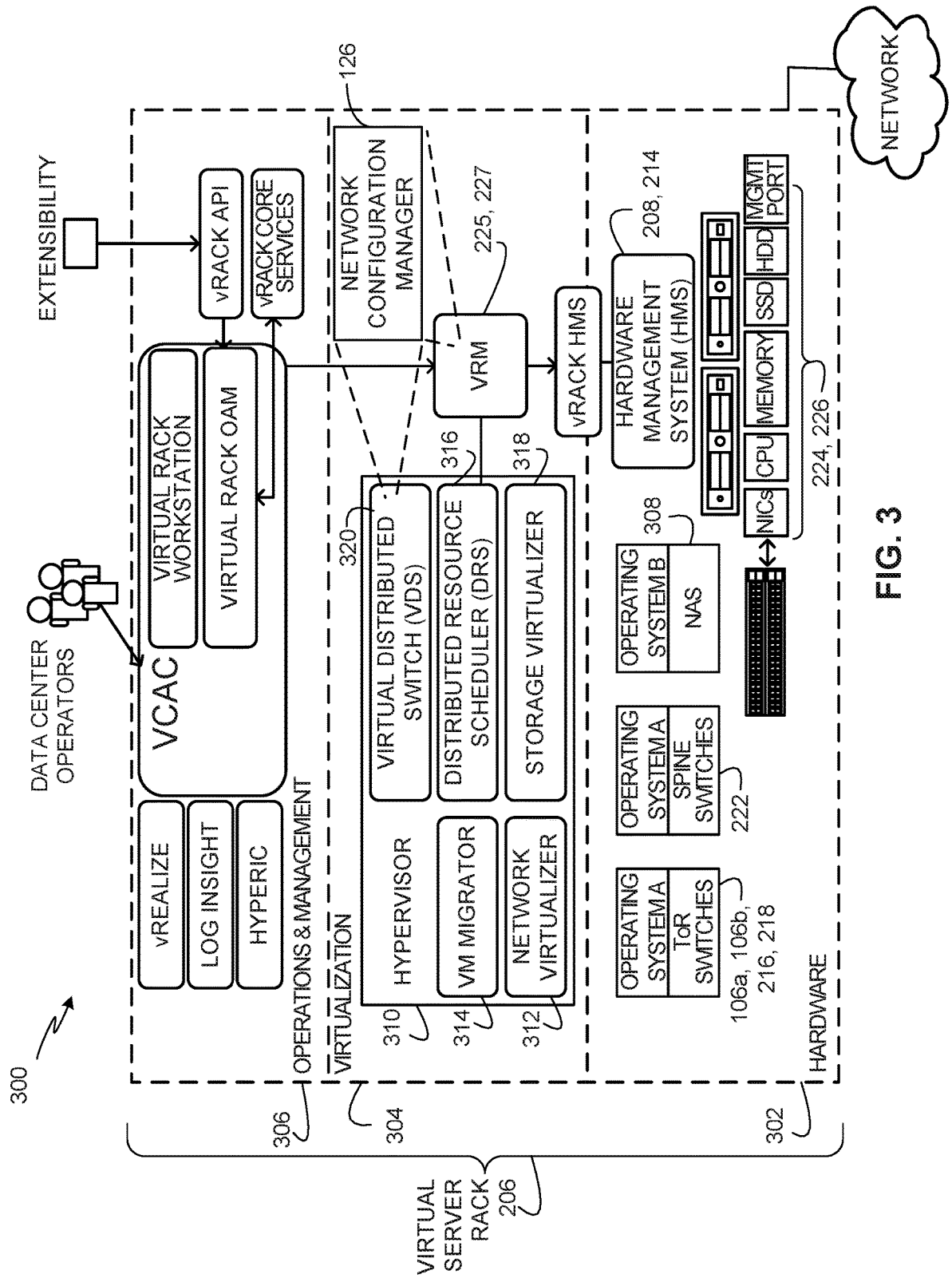
FIG. 3 depicts an example architecture to configure and deploy the example virtual server rack of FIG. 2 and to implement LBT over LAG network topologies in accordance with teachings of this disclosure.

In the illustrated example of FIG. 1, an example network configuration manager 126 is provided to create, monitor, and manage the LBT over LAG network configuration 100 of FIG. 1 and/or any other LBT over LAG network topology implemented in accordance with the teachings of this disclosure. In the illustrated example, the network configuration manager 126 is configured in the VDS 116. In other examples, the network configuration manager 126 may be implemented in other suitable components running in the hypervisor 110. For example, as shown in FIG. 3 described below, the network configuration manager 126 could alternatively be implemented in an example virtual rack manager (VRM) 225, 227 (e.g., a software defined data center manager). In some examples, the network configuration manager 126 is implemented in both the VDS 116 and the VRM 225, 227. For example, separate instances of the network configuration manager 126 may be implemented in both the VDS 116 and the VRM 225, 227 for redundancy and/or different aspects of the network configuration manager 126 may be implemented across the VDS 116 and the VRM 225, 227. The example network configuration manager 126 is described in more detail below in connection with FIG. 4.

Examples disclosed herein may be employed with HCI-based SDDCs deployed using virtual server rack systems such as the virtual server rack 206 of FIG. 2. A virtual server rack system can be managed using a set of tools that is accessible to all components of the virtual server rack system. Virtual server rack systems can be configured in many different sizes. Some systems are as small as four hosts, and other systems are as big as tens of racks. As described in more detail below in connection with FIGS. 2 and 3, multi-rack deployments can include ToR switches (e.g., leaf switches) (e.g., the ToR switches 106a,b of FIG. 1) and spine switches connected using a Leaf-Spine architecture. A virtual server rack system also includes software-defined data storage (e.g., storage area network (SAN), VMWARE® VIRTUAL SAN™) distributed across multiple hosts for redundancy and virtualized networking software (e.g., VMWARE NSX™).

FIG. 2 depicts example physical racks 202, 204 in an example deployment of a virtual server rack 206 in which the example LBT over LAG network configuration 100 of FIG. 1 may be implemented, and/or more generally in which any LBT over LAG network topology may be implemented in accordance with teachings of this disclosure. The virtual server rack 206 of the illustrated example enables representing hardware resources (e.g., physical hardware resources 224, 226) as logical/virtual resources. In some examples, the virtual server rack 206 includes a set of physical units (e.g., one or more racks) with each unit including hardware such as server nodes (e.g., compute+storage+network links), network switches, and, optionally, separate storage units. From a user perspective, the example virtual server rack 206 is an aggregated pool of logic resources exposed as one or more VMWARE ESXI™ clusters along with a logical storage pool and network connectivity. In examples disclosed herein, a cluster is a server group in a virtual environment. For example, a VMWARE ESXI™ cluster is a group of physical servers in the physical hardware resources that run VMWARE ESXI™ hypervisors to virtualize processor, memory, storage, and networking resources into logical resources to run multiple VMs that run OSs and applications as if those OSs and applications were running on physical hardware without an intermediate virtualization layer.

In the illustrated example, the first physical rack 202 includes the example ToR switches 106a,b of FIG. 1, an example management switch 207, and an example server host node(0) 209. In the illustrated example, the management switch 207 and the server host node(0) 209 run a hardware management system (HMS) 208 for the first physical rack 202. The second physical rack 204 of the illustrated example is also provided with an example ToR switch A 216, an example ToR switch B 218, an example management switch 213, and an example server host node (0) 211. In the illustrated example, the management switch 213 and the server host node (0) 211 run an HMS 214 for the second physical rack 204.

In the illustrated example, the HMS 208, 214 connects to server management ports of the server host node(0) 209, 211 (e.g., using a baseboard management controller (BMC)), connects to ToR switch management ports (e.g., using 1 Gbps links) of the ToR switches 106a, 106b, 216, 218, and also connects to spine switch management ports of one or more spine switches 222. In the illustrated example, the ToR switches 106a, 106b, 216, 218, implement leaf switches such that the ToR switches 106a, 106b, 216, 218, and the spine switches 222 are in communication with one another in a leaf-spine switch configuration. These example connections form a non-routable private Internet protocol (IP) management network for out-of-band (OOB) management. The HMS 208, 214 of the illustrated example uses this OOB management interface to the server management ports of the server host node(0) 209, 211 for server hardware management. In addition, the HMS 208, 214 of the illustrated example uses this OOB management interface to the ToR switch management ports of the ToR switches 106a, 106b, 216, 218 and to the spine switch management ports of the one or more spine switches 222 for switch management. In examples disclosed herein, the ToR switches 106a, 106b, 216, 218 connect to pNICs (e.g., using 10 Gbps links) of server hosts in the physical racks 202, 204 for downlink communications. For example, the ToR switches 106a,b connect to the pNICs 108a-d as shown in FIG. 1. The example ToR switches 106a, 106b, 216, 218 also connect to spine switch(es) 222 (e.g., using 40 Gbps links) for uplink communications. In the illustrated example, the management switch 207, 213 is also connected to the ToR switches 106a, 106b, 216, 218 (e.g., using a 10 Gbps link) for internal communications between the management switch 207, 213 and the ToR switches 106a, 106b, 216, 218. Also in the illustrated example, the HMS 208, 214 is provided with in-band (IB) connectivity to individual server nodes (e.g., server nodes in example physical hardware resources 224, 226) of the physical rack 202, 204. In the illustrated example, the IB connection interfaces to physical hardware resources 224, 226 via an OS running on the server nodes using an OS-specific application programming interface (API) such as VMWARE VSPHERE® API, command line interface (CLI), and/or interfaces such as Common Information Model from Distributed Management Task Force (DMTF).

Example OOB operations performed by the HMS 208, 214 include discovery of new hardware, bootstrapping, remote power control, authentication, hard resetting of non-responsive hosts, monitoring catastrophic hardware failures, and firmware upgrades. The example HMS 208, 214 uses IB management to periodically monitor status and health of the physical resources 224, 226 and to keep server objects and switch objects up to date. Example IB operations performed by the HMS 208, 214 include controlling power state, accessing temperature sensors, controlling Basic Input/Output System (BIOS) inventory of hardware (e.g., central processing units (CPUs), memory, disks, etc.), event monitoring, and logging events.

The HMSs 208, 214 of the corresponding physical racks 202, 204 interface with VRMs 225, 227 (e.g., software defined data center managers) of the corresponding physical racks 202, 204 to instantiate and manage the virtual server rack 206 using physical hardware resources 224, 226 (e.g., processors, pNICs, servers, switches, storage devices, peripherals, power supplies, etc.) of the physical racks 202, 204. In the illustrated example, the VRM 225 of the first physical rack 202 runs on a cluster of three server host nodes of the first physical rack 202, one of which is the server host node(0) 209. In the illustrated example, the VRM 227 of the second physical rack 204 runs on a cluster of three server host nodes of the second physical rack 204, one of which is the server host node(0) 211. In the illustrated example, the VRMs 225, 227 of the corresponding physical racks 202, 204 communicate with each other through one or more spine switches 222. Also in the illustrated example, communications between physical hardware resources 224, 226 of the physical racks 202, 204 are exchanged between the ToR switches 106a, 106b, 216, 218 of the physical racks 202, 204 through the one or more spine switches 222. In the illustrated example, each of the ToR switches 106a, 106b, 216, 218 is connected to each of two spine switches 222. In other examples, fewer or more spine switches may be used. For example, additional spine switches may be added when physical racks are added to the virtual server rack 206.

The VRM 225 of the first physical rack 202 runs on a cluster of three server host nodes of the first physical rack 202 using a high availability (HA) mode configuration. In addition, the VRM 227 of the second physical rack 204 runs on a cluster of three server host nodes of the second physical rack 204 using the HA mode configuration. Using the HA mode in this manner, enables fault tolerant operation of the VRM 225, 227 in the event that one of the three server host nodes in the cluster for the VRM 225, 227 fails. Upon failure of a server host node executing the VRM 225, 227, the VRM 225, 227 can be restarted to execute on another one of the hosts in the cluster. Therefore, the VRM 225, 227 continues to be available even in the event of a failure of one of the server host nodes in the cluster.

In examples disclosed herein, a CLI and APIs are used to manage the ToR switches 106a, 106b, 216, 218. For example, the HMS 208, 214 uses CLI/APIs to populate switch objects corresponding to the ToR switches 106a, 106b, 216, 218. On HMS bootup, the HMS 208, 214 populates initial switch objects with statically available information. In addition, the HMS 208, 214 uses a periodic polling mechanism as part of an HMS switch management application thread to collect statistical and health data from the ToR switches 106a, 106b, 216, 218 (e.g., Link states, Packet Stats, Availability, etc.). There is also a configuration buffer as part of the switch object which stores the configuration information to be applied on the switch.

The HMS 208, 214 of the illustrated example of FIG. 2 is a stateless software agent responsible for managing individual hardware resources in a physical rack 202, 204. Examples of hardware elements that the HMS 208, 214 manages are servers and network switches in the physical rack 202, 204. In the illustrated example, the HMS 208, 214 is implemented using Java on Linux so that an OOB management portion of the HMS 208, 214 runs as a Java application on a white box management switch (e.g., the management switch 207, 213) in the physical rack 202, 204. However, any other programming language and any other OS may be used to implement the HMS 208, 214.

FIG. 3 depicts an example virtual server rack architecture 300 that may be used to configure and deploy the virtual server rack 206 of FIG. 2 and to implement the example LBT over LAG network configuration 100 of FIG. 1, and/or more generally any LBT over LAG network topology in accordance with teachings of this disclosure. The example architecture 300 of FIG. 3 includes a hardware layer 302, a virtualization layer 304, and an operations and management (OAM) layer 306. In the illustrated example, the hardware layer 302, the virtualization layer 304, and the OAM layer 306 are part of the example virtual server rack 206 of FIG. 2. The virtual server rack 206 of the illustrated example is based on the physical racks 202, 204 of FIG. 2. The example virtual server rack 206 configures the physical hardware resources 224, 226, virtualizes the physical hardware resources 224, 226 into virtual resources, provisions virtual resources for use in providing cloud-based services, and maintains the physical hardware resources 224, 226 and the virtual resources.

The example hardware layer 302 of FIG. 3 includes the HMS 208, 214 of FIG. 2 that interfaces with the physical hardware resources 224, 226 (e.g., processors, pNICs, servers, switches, storage devices, peripherals, power supplies, etc.), the ToR switches 106a, 106b, 216, 218 of FIG. 2, the spine switches 222 of FIG. 2, and network attached storage (NAS) hardware 308. The HMS 208, 214 is configured to manage individual hardware nodes such as different ones of the physical hardware resources 224, 226. For example, managing of the hardware nodes involves discovering nodes, bootstrapping nodes, resetting nodes, processing hardware events (e.g., alarms, sensor data threshold triggers) and state changes, exposing hardware events and state changes to other resources and a stack of the virtual server rack 206 in a hardware-independent manner. The HMS 208, 214 also supports rack-level boot-up sequencing of the physical hardware resources 224, 226 and provides services such as secure resets, remote resets, and/or hard resets of the physical hardware resources 224, 226.

The HMS 208, 214 of the illustrated example is part of a dedicated management infrastructure in a corresponding physical rack 202, 204 including the dual-redundant management switches 207, 213 and dedicated management ports attached to the server host nodes(0) 209, 211 and the ToR switches 106a, 106b, 216, 218. In the illustrated example, one instance of the HMS 208, 214 runs per physical rack 202, 204. For example, the HMS 208, 214 may run on the management switch 207, 213 and the server host node(0) 209, 211 installed in the example physical rack 202 of FIG. 2. In the illustrated example of FIG. 2 both of the HMSs 208, 214 are provided in corresponding management switches 207, 213 and the corresponding server host nodes(0) 209, 211 as a redundancy feature in which one of the HMSs 208, 214 is a primary HMS, while the other one of the HMSs 208, 214 is a secondary HMS. In this manner, one of the HMSs 208, 214 may take over as a primary HMS in the event of a failure of a hardware management switch 207, 213 and/or a failure of the server host nodes(0) 209, 211 on which the other HMS 208, 214 executes. In some examples, to achieve seamless failover, two instances of an HMS 208, 214 run in a single physical rack 202, 204. In such examples, the physical rack 202, 204 is provided with two management switches, and each of the two management switches runs a separate instance of the HMS 208, 214. In such examples, the physical rack 202 of FIG. 2 runs two instances of the HMS 208 on two separate physical hardware management switches and two separate server host nodes(0), and the physical rack 204 of FIG. 2 runs two instances of the HMS 214 on two separate physical hardware management switches and two separate server host nodes(0). In this manner, for example, one of the instances of the HMS 208 on the physical rack 202 serves as the primary HMS 208 and the other instance of the HMS 208 serves as the secondary HMS 208. The two instances of the HMS 208 on two separate management switches and two separate server host nodes(0) in the physical rack 202 (or the two instances of the HMS 214 on two separate management switches and two separate server host nodes(0) in the physical rack 204) are connected over a point-to-point, dedicated Ethernet link which carries heartbeats and memory state synchronization between the primary and secondary HMS instances.

The example virtualization layer 304 includes the VRM 225, 227. The example VRM 225, 227 communicates with the HMS 208, 214 to manage the physical hardware resources 224, 226. The example VRM 225, 227 creates the example virtual server rack 206 out of underlying physical hardware resources 224, 226 that may span one or more physical racks (or smaller units such as a hyper-appliance or half rack) and handles physical management of those resources. The example VRM 225, 227 uses the virtual server rack 206 as a basis of aggregation to create and provide operational views, handle fault domains, and scale to accommodate workload profiles. The example VRM 225, 227 keeps track of available capacity in the virtual server rack 206, maintains a view of a logical pool of virtual resources throughout the SDDC life-cycle, and translates logical resource provisioning to allocation of physical hardware resources 224, 226. The example VRM 225, 227 interfaces with an example hypervisor 310 of the virtualization layer 304. The example hypervisor 310 is installed and runs on server hosts in the example physical resources 224, 226 to enable the server hosts to be partitioned into multiple logical servers to create VMs. For example, the hypervisor 310 of FIG. 3 may be used to implement the hypervisor 110 of FIG. 1 to create the VM 114 in the virtual environment 112. In some examples, the hypervisor 310 may be implemented using a VMWARE ESXI™ hypervisor available as a component of a VMWARE VSPHERE® virtualization suite developed and provided by VMware, Inc. The VMWARE VSPHERE® virtualization suite is a collection of components to setup and manage a virtual infrastructure of servers, networks, and other resources.

In the illustrated example, the VRM 225, 227 and/or the hypervisor 310 may be used to implement a virtual cloud management system for a SDDC platform. An example virtual cloud management system that may be used with examples disclosed herein is the VMware Cloud Foundation (VCF) platform developed and provided by VMware, Inc. The virtual cloud management system implemented by the VRM 225, 227 and/or the hypervisor 310 manages different parameters of the ToR switches 106a, 106b, 216, 218, the spine switches 222, and the NAS 308. In some examples, the virtual cloud management system commands different components even when such components run different OSs.

In the illustrated example of FIG. 3, the hypervisor 310 is shown having a number of virtualization components executing thereon including an example network virtualizer 312, an example VM migrator 314, an example distributed resource scheduler (DRS) 316, an example storage virtualizer 318, and an example VDS 320. In the illustrated example, the VRM 225, 227 communicates with these components to manage and present the logical view of underlying resources such as hosts and clusters. The example VRM 225, 227 also uses the logical view for orchestration and provisioning of workloads.

The example network virtualizer 312 virtualizes network resources such as physical hardware switches (e.g., the management switches 207, 213 of FIG. 2, the ToR switches 106a, 106b, 216, 218, and/or the spine switches 222) to provide software-based virtual networks. The example network virtualizer 312 enables treating physical network resources (e.g., switches) as a pool of transport capacity. In some examples, the network virtualizer 312 also provides network and security services to VMs with a policy driven approach. The network virtualizer 312 includes a number of components to deploy and manage virtualized network resources across servers, switches, and clients. For example, the network virtualizer 312 includes a network virtualization manager that functions as a centralized management component of the network virtualizer 312 and runs as a virtual appliance on a server host. In some examples, the network virtualizer 312 may be implemented using a VMWARE NSX™ network virtualization platform that includes a number of components including a VMWARE NSX™ network virtualization manager.

The example VM migrator 314 is provided to move or migrate VMs between different hosts without losing state during such migrations. For example, the VM migrator 314 allows moving an entire running VM from one physical server to another with substantially little or no downtime. The migrating VM retains its network identity and connections, which results in a substantially seamless migration process. The example VM migrator 314 enables transferring the VM's active memory and precise execution state over a high-speed network, which allows the VM to switch from running on a source server host to running on a destination server host.

The example DRS 316 is provided to monitor resource utilization across resource pools, to manage resource allocations to different VMs, to deploy additional storage capacity to VM clusters with substantially little or no service disruptions, and to work with the VM migrator 314 to automatically migrate VMs during maintenance with substantially little or no service disruptions.

The example storage virtualizer 318 is software-defined storage for use in connection with virtualized environments. The example storage virtualizer 318 clusters server-attached hard disk drives (HDDs) and solid state drives (SSDs) to create a shared datastore for use as virtual storage resources in virtual environments. In some examples, the storage virtualizer 318 may be implemented using a VMWARE® VIRTUAL SAN™ network data storage virtualization component developed and provided by VMware, Inc.

The example VDS 320 implements software-defined networks for use in connection with virtualized environments in the form of a networking module for the hypervisor 310. For example, the VDS 320 of FIG. 3 may be used to implement the VDS 116 of FIG. 1. In the illustrated example, the VDS 320 and/or the VRM 225, 227 may be used to implement the example network configuration manager 126 of FIG. 1. In some examples, the VDS 320 is distributed across multiple hosts and across separate hypervisors of those hosts.

The virtualization layer 304 of the illustrated example, and its associated components are configured to run VMs. However, in other examples, the virtualization layer 304 may additionally, and/or alternatively, be configured to run containers. For example, the virtualization layer 304 may be used to deploy a VM as a data computer node with its own guest OS on a host using resources of the host. Additionally, and/or alternatively, the virtualization layer 304 may be used to deploy a container as a data computer node that runs on top of a host OS without the need for a hypervisor or separate OS.

In the illustrated example, the OAM layer 306 is an extension of a VMWARE VCLOUD® AUTOMATION CENTER™ (VCAC) that relies on the VCAC functionality and also leverages utilities such as VMWARE VCENTER™ Log Insight™, and VMWARE VCENTER™ HYPERIC® to deliver a single point of SDDC operations and management. The example OAM layer 306 is configured to provide different services such as health monitoring service, capacity planner service, maintenance planner service, events and operational view service, and virtual rack application workloads manager service.

Example components of FIG. 3 may be implemented using products developed and provided by VMware, Inc. Alternatively, some or all of such components may alternatively be supplied by components with the same and/or similar features developed and/or provided by other virtualization component developers.

Figure 4:
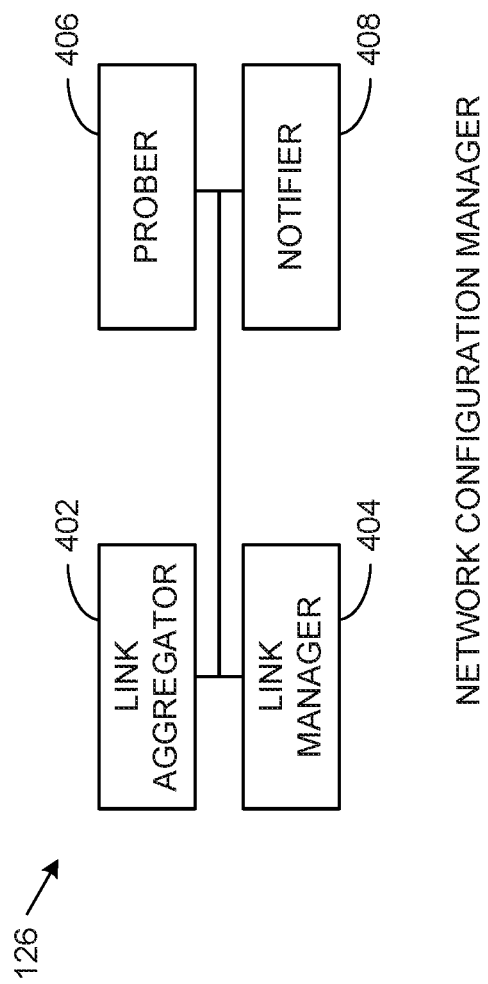
FIG. 4 depicts a block diagram of the example network configuration manager of FIGS. 1 and/or 3 that may be used to implement LBT over LAG network topologies in accordance with teachings of this disclosure.

FIG. 4 depicts a block diagram of the example network configuration manager 126 that may be used to implement LBT over LAG network topologies in accordance with teachings of this disclosure. In some examples, the network configuration manager 126 is implemented by a virtual network distributed switch (e.g., the VDS 116 of FIG. 1 and/or the VDS 320 of FIG. 3). In other examples, the network configuration manager 126 is implemented by a virtual rack manager (e.g., the VRM 225, 227 of FIGS. 2 and 3). In any case, the example network configuration manager 126 is configured to create LBT over LAG network topologies such as the LBT over LAG network configuration 100 of FIG. 1 and/or any other LBT over LAG network topology including example topologies discussed below in connection with FIG. 5.

In the illustrated example of FIG. 4, the network configuration manager 126 is provided with an example link aggregator 402 to aggregate pNICs to create LAGs. For example, in the LBT over LAG network configuration 100 of FIG. 1, the link aggregator 402 aggregates a first plurality of pNICs, such as the pNICs 108a,b of FIG. 1, to create a first LAG such as the LAG 102a of FIG. 1, and aggregates a second plurality of pNICs, such as the pNICs 108c,d of FIG. 1, to create a second LAG such as the LAG 102b of FIG. 1.

The example network configuration manager 126 is provided with an example link manager 404 to connect LAGs between dvports and ToR switches. For example, in the LBT over LAG network configuration 100 of FIG. 1, the link manager 404 connects the first LAG 102a between the first dvport 124a and the first ToR switch 106a, and connects the second LAG 102b between the second dvport 124b and the second ToR switch 106b.

In addition, the example link manager 404 is provided to manage LBT over LAG network topologies by performing load balancing operations based on LBT policies and monitoring for invalid LBT over LAG network topologies. To load balance, the example link manager 404 creates new LAG connections when a current LAG connection satisfies a maximum utilization threshold. For example, the example link manager 404 may create the second LAG 102b of FIG. 1 and connect the second LAG 102b between the second dvport 124b and the second ToR switch 106b when the link manager 404 detects that a link utilization of the first LAG 102a of FIG. 1 satisfies the maximum utilization threshold. The maximum utilization threshold may be 75%, or any other percentage, of the total possible bandwidth utilization of the one or more pNICs that form a LAG. For example, if each of the pNICs 108a,b of the first LAG 102a of FIG. 1 is a 10 Gbps NIC, the total possible bandwidth utilization of the first LAG 102a is 20 Gbps. In some examples, the maximum utilization threshold per LAG that the link manager 404 uses for load balancing is selectable by an administrator to be any suitable percentage of the total possible bandwidth utilization of the LAG.

To monitor for validity of LBT over LAG network topologies, the example link manager 404 uses probe messages (e.g., probe packets as network communications). For example, the link manager 404 instructs an example prober 406 to send one or more probe messages into active LAGs. The example link manager 404 uses the probe message transmissions to determine whether active LBT over LAG network topologies are valid or invalid based on probe responses. In the illustrated example, the prober 406 sends probe messages that include destination addresses (e.g., internet protocol (IP) addresses, media access control (MAC) addresses, etc.) of destination devices (e.g., the hosts 104b,c of FIG. 1) that would require routing the probe messages through an originating LAG (e.g., the LAG 102a of FIG. 1) and a ToR switch (e.g., the ToR switch 106a of FIG. 1) such that the probe messages do not reroute or loop back through the originating LAG. When an LBT over LAG network topology is valid, a probe message does not reroute or loop back through the originating LAG, and instead is delivered to the intended destination address. However, when an LBT over LAG network topology is invalid, an invalidating network connection in the LBT over LAG network topology causes a probe message to reroute or loop back through the originating LAG and is received as a probe response by the prober 406. The example link manager 404 can analyze the received probe response to identify routing information that was stored in the probe response by network switches (e.g., the ToR switch 106a) during routing through network connections. Based on the routing information in the probe response, the link manager 404 can determine one or more network connections in the LBT over LAG network topology that make the LBT over LAG network topology invalid. Examples of detecting and correcting of invalid LBT over LAG network topologies are discussed in more detail below in connection with FIG. 5.

In the illustrated example, the network configuration manager 126 is provided with an example notifier 408 to generate notifications pertaining to creating and/or managing LBT over LAG network topologies. For example, the notifier 408 may generate notifications to be presented to administrators when invalid connections are detected. Example notifications may indicate that a detected invalid configuration is preventing the network configuration manager 126 from forming an LBT over LAG network topology or that the network configuration manager 126 has performed a corrective action to fix a detected invalid configuration to create a valid network topology.

Figure 5:
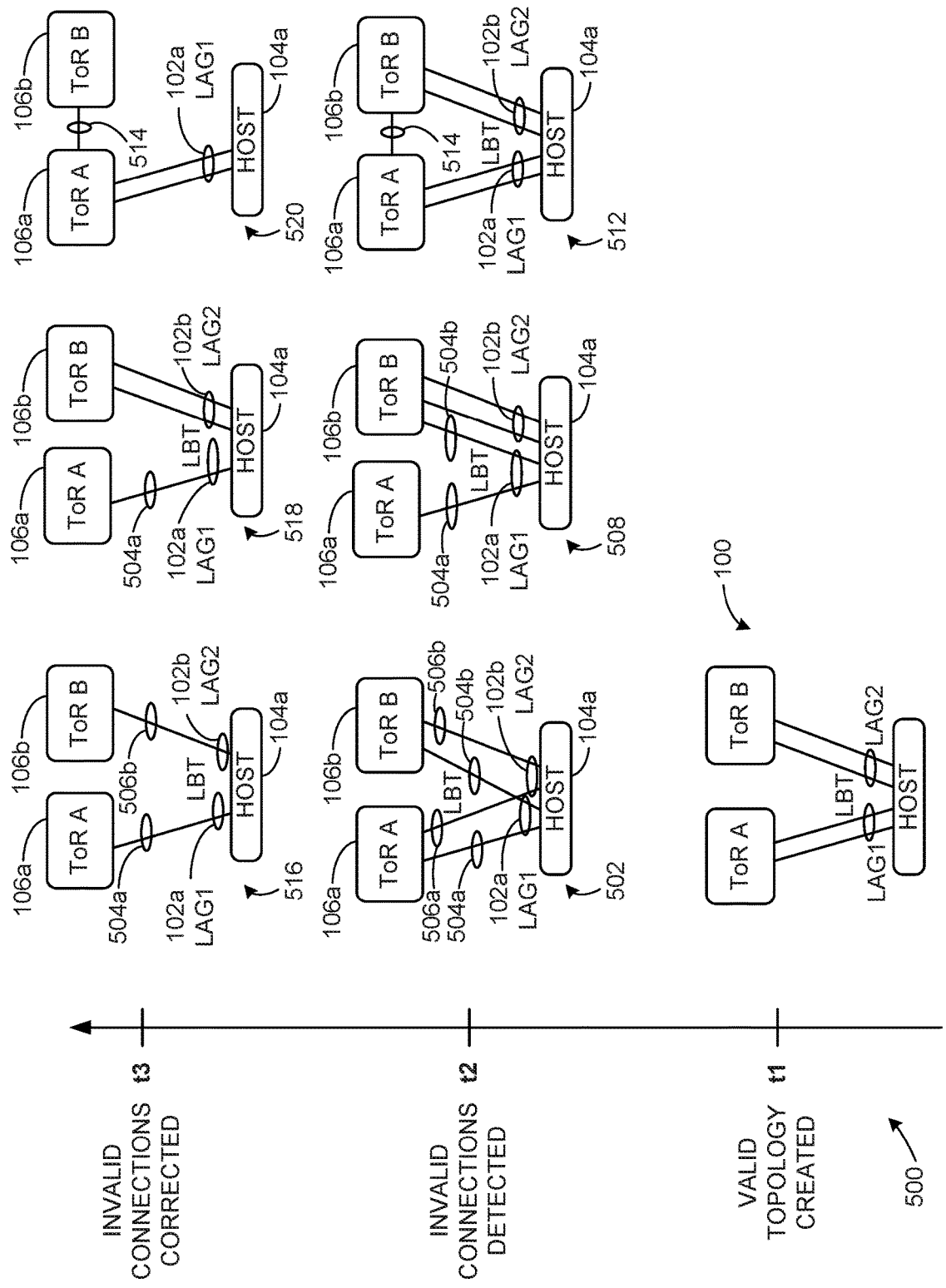
FIG. 5 is an example timeline showing the creation and management of example LBT over LAG network topologies in accordance with teachings of this disclosure.

FIG. 5 is an example timeline 500 showing the creation and management of example LBT over LAG network topologies in accordance with teachings of this disclosure. The example timeline 500 shows three separate times denoted as time t1, time t2, and time t3. At time t1, the example network configuration manager 126 of FIG. 1 creates a valid LBT over LAG network topology shown as the LBT over LAG network configuration 100 of FIG. 1. At some point between time t1 and time t2, one or more invalid network connections are made in the LBT over LAG network topology 100. In the illustrated example of FIG. 5, the example timeline 500 shows three example invalid LBT over LAG network topologies at time t2 having invalid connections detectable by the example link manager 404 of FIG. 4. In a first example invalid LBT over LAG network topology 502, the link manager 404 determines that the first LAG 102a includes first and second links 504a,b connected from the host 104a to different ones of the first and second ToR switches 106a,b, and that the second LAG 102b includes third and fourth links 506a,b connected from the host 104a to different ones of the first and second ToR switches 106a,b. In a second example invalid LBT over LAG network topology 508, the link manager 404 determines that the first LAG 102a includes first and second links 504a,b connected from the host 104a to different ones of the first and second ToR switches 106a,b. The first invalid LBT over LAG network topology 502 and the second invalid LBT over LAG network topology 508 are invalid because each includes at least one LAG having connections to separate ToR switches. In a third example invalid LBT over LAG network topology 508, the link manager 404 determines that an inter-ToR switch connection 514 is made between the first and second ToR switches 106a,b. The third invalid LBT over LAG network topology 512 is invalid because the ToR switches 106a,b are not disjointed from one another.

Between the time t2 and a time t3 of the example timeline 500, the link manager 404 performs corrective processes to correct the invalid connections detected at time t2 to make the invalid LBT over LAG network topologies 502, 508, 512 into corresponding valid network topologies 516, 518, 520 shown at time t3. In the illustrated example, the link manager 404 makes a first example valid LBT over LAG network topology 516 based on the invalid LBT over LAG network topology 502 by removing the second link 504b from the first LAG 102a and removing the third link 506a from the second LAG 102b. The example link manager 404 makes a second example valid LBT over LAG network topology 518 based on the invalid LBT over LAG network topology 508 by removing the second link 504b from the first LAG 102a. In this manner, the link manager 404 makes the first and second valid LBT over LAG network topologies 516, 518 by reconfiguring connections of the topologies so that each LAG 102a,b is connected to only one ToR switch. For example, in the first valid LBT over LAG network topology 516, the corrective action by the link manager 404 results in the remaining link 504a of the first LAG 102a being connected to only the first ToR switch 106a and the remaining link 506b of the second LAG 102b being connected to only the second ToR switch 106b. In the second example valid LBT over LAG network topology 518, the corrective action by the link manager 404 results in the remaining link 504a of the first LAG 102a being connected to only the first ToR switch 106a and the remaining links 506a,b of the second LAG 102b being connected to only the second ToR switch 106b.

The example link manager 404 makes a third example valid LAG network topology 520 based on the invalid LBT over LAG network topology 512 by removing the second LAG 102b. The link manager 404 performs this corrective action of removing the second LAG 102b because it does not have access to remove the inter-ToR switch connection 514 between the ToR switches 106a,b. As such, the result is the valid LAG network topology 520 which is no longer an LBT over LAG network topology. Subsequently, if the link manager 404 determines that the inter-ToR switch connection 514 is removed, the link aggregator 402 can re-create the second LAG 102b and the link manager 404 can re-connect the second LAG 102b between the host 104a and the second ToR switch 106b to make a valid LBT over LAG network topology.

In some examples, means for forming link aggregated groups is implemented by the link aggregator 402 of FIG. 4. In some examples, means for managing configurations of link aggregated groups is implemented by the link manager 404 of FIG. 4. In some examples, means for probing is implemented by the prober 406 of FIG. 4. In some examples, means for notifying is implemented by the notifier 408 of FIG. 4.

While an example manner of implementing the network configuration manager 126 of FIGS. 1 and 3 is illustrated in FIG. 4, one or more of the elements, processes and/or devices illustrated in FIG. 4 may be combined, divided, re-arranged, omitted, eliminated and/or implemented in any other way. Further, the example link aggregator 402, the example link manager 404, the example prober 406, the example notifier 408 and/or, more generally, the example network configuration manager 126 of FIGS. 1 and 3 may be implemented by hardware, software, firmware and/or any combination of hardware, software and/or firmware. Thus, for example, any of example link aggregator 402, the example link manager 404, the example prober 406, the example notifier 408 and/or, more generally, the example network configuration manager 126 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example link aggregator 402, the example link manager 404, the example prober 406, and/or the example notifier 408 is/are hereby expressly defined to include a non-transitory computer readable storage device or storage disk such as a memory, a digital versatile disk (DVD), a compact disk (CD), a Blu-ray disk, etc. including the software and/or firmware. Further still, the example network configuration manager 126 of FIGS. 1 and 3 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
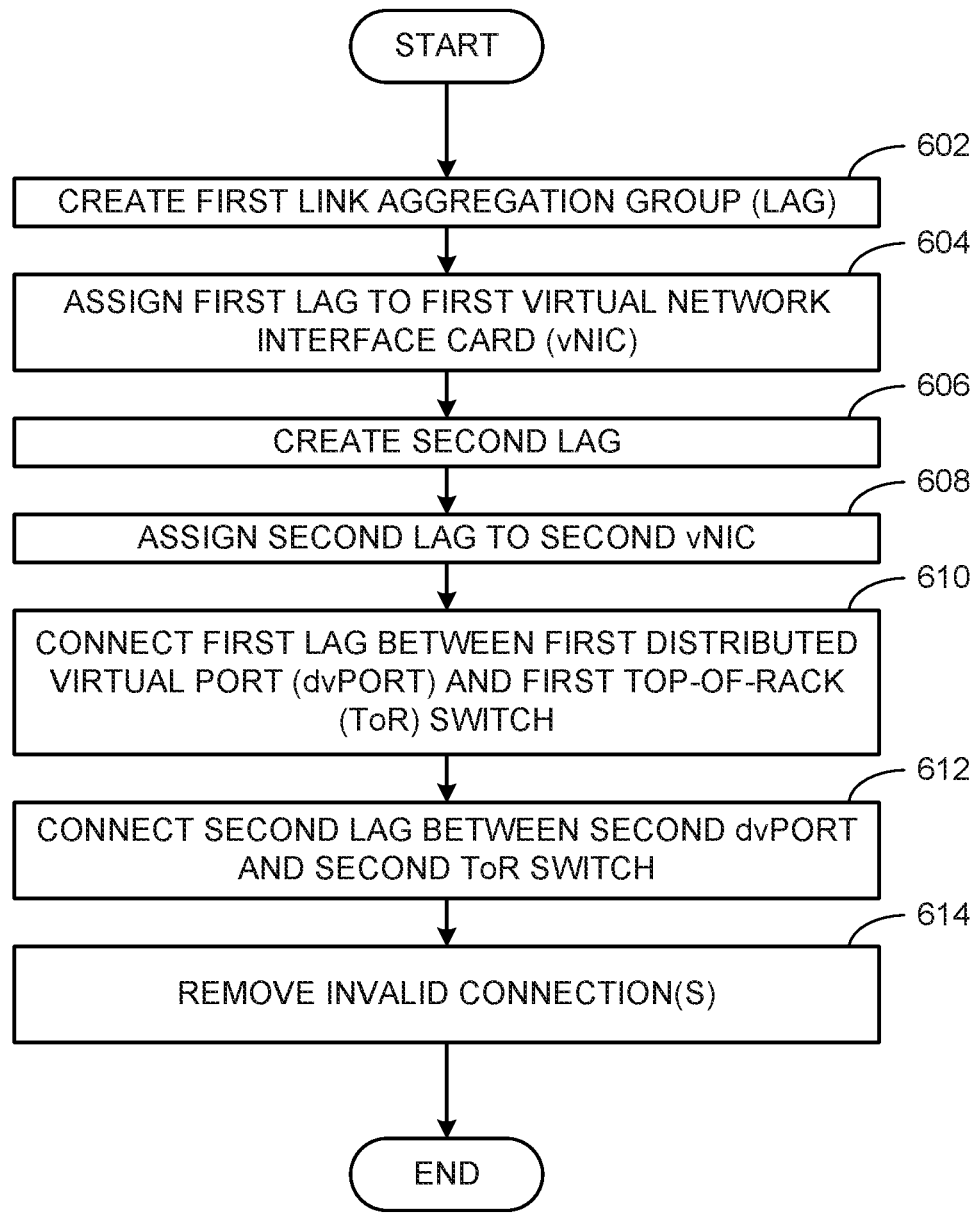
FIG. 6 is a flowchart representative of example machine-readable instructions that may be executed to implement the example network configuration manager of FIGS. 1, 3, and/or 4 to create and manage LBT over LAG network topologies.
Figure 7:
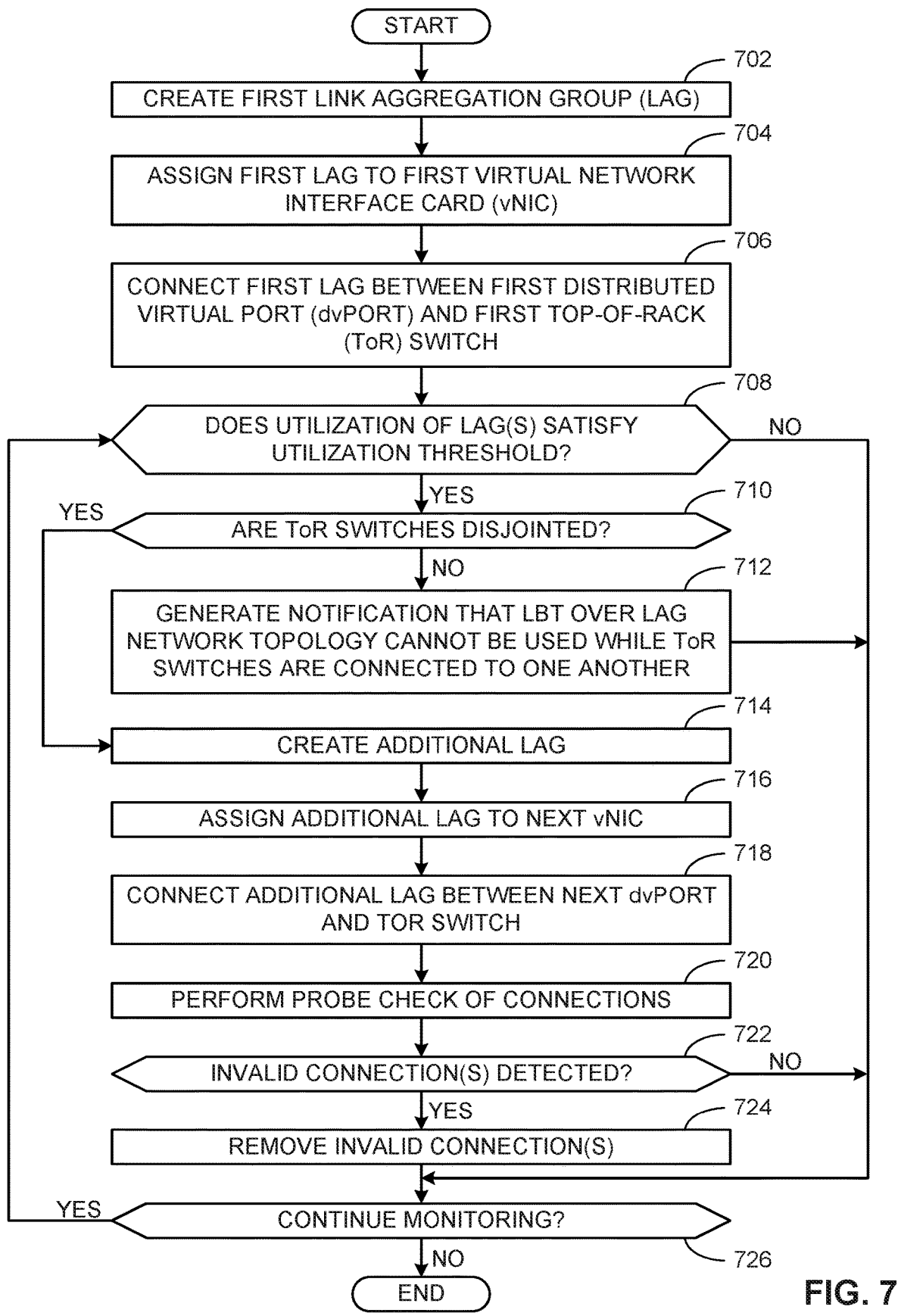
FIG. 7 is another flowchart representative of machine-readable instructions that may be executed to implement the example network configuration manager of FIGS. 1, 3, and/or 4 to create and manage LBT over LAG network topologies.

Flowcharts representative of example hardware logic or machine-readable instructions for implementing the network configuration manager 126 of FIGS. 1, 3 and 4 are shown in FIGS. 6 and 7. The machine-readable instructions may be a program or portion of a program for execution by a processor such as the processor 912 shown in the example processor platform 900 discussed below in connection with FIG. 9. The programs may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 6 and 7, many other methods of implementing the example network configuration manager 126 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 6 and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 6 is a flowchart representative of example machine-readable instructions that may be executed to implement the example network configuration manager 126 of FIGS. 1, 3, and 4 to create and manage LBT over LAG network topologies (e.g., the LBT over LAG network configuration 100 of FIG. 1 and/or any other LBT over LAG network topology implemented in accordance with the teachings of this disclosure). The example process of FIG. 6 begins at block 602 at which the example link aggregator 402 (FIG. 4) creates a first LAG. For example, the link aggregator 402 aggregates a first plurality of pNICs, such as the pNICs 108a,b of FIG. 1, to create a first LAG, such as the first LAG 102a of FIG. 1. The example link manager 404 assigns the first LAG to a first vNIC (block 604). For example, the link manager 404 assigns the first LAG 102a to the first vNIC 118a of FIG. 1.

The example link aggregator 402 creates a second LAG (block 606). For example, the link aggregator 402 aggregates a second plurality of pNICs, such as the pNICs 108c,d of FIG. 1, to create the second LAG, such as the second LAG 102b of FIG. 1. The example link manager 404 assigns the second LAG to a second vNIC (block 608). For example, the link manager 404 assigns the second LAG 102b to the second vNIC 118b of FIG. 1. The example link manager 404 connects the first LAG between a first dvport and a first ToR switch (block 610). For example, the link manager 404 connects the first LAG 102a between the first dvport 124a and the first ToR switch 106a of FIG. 1. The example link manager 404 connects the second LAG between a second dvport and a second ToR switch (block 612). For example, the link manager 404 connects the second LAG 102b between the second dvport 124b and the second ToR switch 106b of FIG. 1. By connecting the second LAG 102b at block 612, the link manager 404 uses an LBT load balancing policy to distribute a network load to the second dvport 124b and the second ToR switch 106b. As such, after the second LAG 102b is connected at block 612, an LBT over LAG network topology is formed (e.g., the LBT over LAG network configuration 100 of FIG. 1).

While the LBT over LAG network topology is in operation, the link manager 404 monitors the LBT over LAG network topology for any invalid connections that render the LBT over LAG network topology invalid. When one or more invalid connections exist, the example link manager 404 removes the one or more invalid connections (block 614). For example, the link manager 404 may use probe messages sent by the example prober 406 (FIG. 4) to identify invalid connections that render an LBT over LAG network topology invalid as described above in connection with FIG. 5. In this manner, by removing the one or more invalid connections, the link manager 404 creates a valid network topology as also described above in connection with FIG. 5. The example process of FIG. 6 then ends.

FIG. 7 is another flowchart representative of machine-readable instructions that may be executed to implement the example network configuration manager 126 of FIGS. 1, 3, and 4 to create and manage LBT over LAG network topologies (e.g., the LBT over LAG network configuration 100 of FIG. 1 and/or any other LBT over LAG network topology implemented in accordance with the teachings of this disclosure). The example process of FIG. 7 begins at block 702 at which the example link aggregator 402 (FIG. 4) creates a first LAG. For example, the link aggregator 402 aggregates a first plurality of pNICs, such as the pNICs 108a,b of FIG. 1, to create a first LAG, such as the first LAG 102*a* of FIG. 1. The example link manager 404 assigns the first LAG to a first vNIC (block 704). For example, the link manager 404 assigns the first LAG 102*a* to the first vNIC 118*a* of FIG. 1. The example link manager 404 connects the first LAG between a first dvport and a first ToR switch (block 706). For example, the link manager 404 connects the first LAG 102*a* between the first dvport 124*a* and the first ToR switch 106*a* of FIG. 1.

The example link manager 404 determines whether the utilization of the first LAG 102*a* satisfies a utilization threshold (block 708). For example, the link manager 404 determines a network traffic utilization of the first LAG 102*a* using any suitable technique and compares the monitored utilization to a maximum utilization threshold specified for the LAG 102*a*. If the link manager 404 determines at block 708 that the utilization of the first LAG 102*a* does not satisfy the maximum utilization threshold, control advances to block 726. Otherwise, if the link manager 404 determines at block 708 that the utilization of the first LAG 102*a* does satisfy the maximum utilization threshold, control advances to block 710 at which the example link manager 404 determines whether ToR switches are disjointed. For example, the link manager 404 identifies ToR switches, such as the ToR switches 106*a,b* of FIG. 1, for use in forming an LBT over LAG network topology, and determines whether those ToR switches are disjointed from one another or connected to one another. The link manager 404 may use any suitable technique to determine whether the ToR switches are disjointed including using probe messages via the prober 406 (FIG. 4). If the example link manager 404 determines at block 710 that the ToR switches are not disjointed, the example notifier 408 generates a notification that an LBT over LAG network topology cannot be used while the ToR switches are connected to one another (block 712), and control advances to block 726. For example, the notification may be presented to an administrator to alert the administrator of the connection between the ToR switches 106*a,b*. In this manner, the administrator has the option to remove the connection so that an LBT over LAG network topology can be formed, or to leave the connection intact between the ToR switches 106*a,b* and forgo the forming of an LBT over LAG network topology.

If the example link manager 404 determines at block 710 that the ToR switches are disjointed, control advances to block 714 based on an LBT load balancing policy used by the link manager 404 to determine that another LAG should be formed. As such, the example link aggregator 402 creates an additional LAG (block 714). For example, the link aggregator 402 aggregates a second plurality of pNICs, such as the pNICs 108*c,d* of FIG. 1, to create the additional LAG, such as the second LAG 102*b* of FIG. 1. The example link manager 404 assigns the additional LAG to a next vNIC (block 716). For example, the link manager 404 assigns the second LAG 102*b* to the second vNIC 118*b* of FIG. 1. The example link manager 404 connects the additional LAG between a next dvport and a ToR switch (block 718). For example, the link manager 404 connects the second LAG 102*b* between the second dvport 124*b* and the second ToR switch 106*b* of FIG. 1. In such an example, by connecting the second LAG 102*b* at block 718, the link manager 404 uses an LBT load balancing policy to distribute a network load to the second dvport 124*b* and the second ToR switch 106*b*. As such, after the second LAG 102*b* is connected at block 718, an LBT over LAG network topology is formed (e.g., the LBT over LAG network configuration 100 of FIG. 1).

While the LBT over LAG network topology is in operation, the link manager 404 monitors the LBT over LAG network topology for any invalid connections that render the LBT over LAG network topology invalid. In the illustrated example of FIG. 7, the link manager 404 performs a probe check of connections (block 720). For example, the prober 406 (FIG. 4) may send probe messages into the active LAG(s), and the link manager 404 may use the probe messages to identify invalid connections that render an LBT over LAG network topology invalid as described above in connection with FIG. 5. The example link manager 404 determines whether any invalid connections are detected (block 722). If invalid connections are not detected at block 722, control advances to block 726. Otherwise, if one or more invalid connection(s) is/are detected at block 722, the example link manager 404 removes the one or more invalid connections (block 724). In this manner, by removing the one or more invalid connections, the link manager 404 creates a valid network topology as described above in connection with FIG. 5.

In some examples, the link manager 404 implements the corrective operation of block 724 by removing an invalid connection between the first plurality of pNICs 108*a,b* and the second ToR switch 106*b* while maintaining the first LAG 102*a* connected between the first dvport 124*a* and the first ToR switch 106*a* and maintaining the second LAG 102*b* connected between the second dvport 124*b* and the second ToR switch 106*b*. In the illustrated example of FIG. 5, such a corrective process is shown where the invalid LBT over LAG network topology 508 is corrected to the valid LBT over LAG network topology 518.

In some examples in which the link manager 404 also detects a second invalid connection between the second plurality of pNICs 108*c,d* and the first ToR switch 106*a*, the link manager 404 implements the correction operation of block 724 by removing the second invalid connection between the second plurality of pNICs 108*c,d* and the first ToR switch 106*a*. In the illustrated example of FIG. 5, such a corrective process is shown where the invalid LBT over LAG network topology 502 is corrected to the valid LBT over LAG network topology 516.

In some examples in which the link manager 404 detects the invalid inter-ToR switch connection 514 (FIG. 5) between the ToR switches 106*a,b*, the link manager 404 implements the corrective operation of block 724 by removing or disconnecting the second LAG 102*b* between the second dvport 124*b* and the second ToR switch 106*b*. In the illustrated example of FIG. 5, such a corrective process is shown where the invalid LBT over LAG network topology 512 is corrected to the valid LBT over LAG network topology 520.

At block 726, the link manager 404 determines whether to continue monitoring network topologies. If the link manager 404 determines at block 726 to continue monitoring network topologies, control returns to block 708. When control returns to block 708, the network configuration manager 126 may form additional LBT over LAG network topologies, reconfigure active LBT over LAG network topologies, and/or tear down active LBT over LAG network topologies. In some examples, when connections that are invalid for LBT over LAG network topologies have been removed, the network configuration manager 126 may re-establish connections forming LBT over LAG network topologies that were disconnected or removed at block 724. In this manner, through ongoing monitoring of network topologies, the network configuration manager 126 can create, remove, and re-connect network connections for LBT over LAG network topologies based on load balancing needs based on an LBT policy and based on the presence or absence of invalid network connections that render invalid LBT over LAG network topologies. If the link manager 404 determines at block 726 to not continue monitoring network topologies, the example process of FIG. 7 ends.

Figure 8:
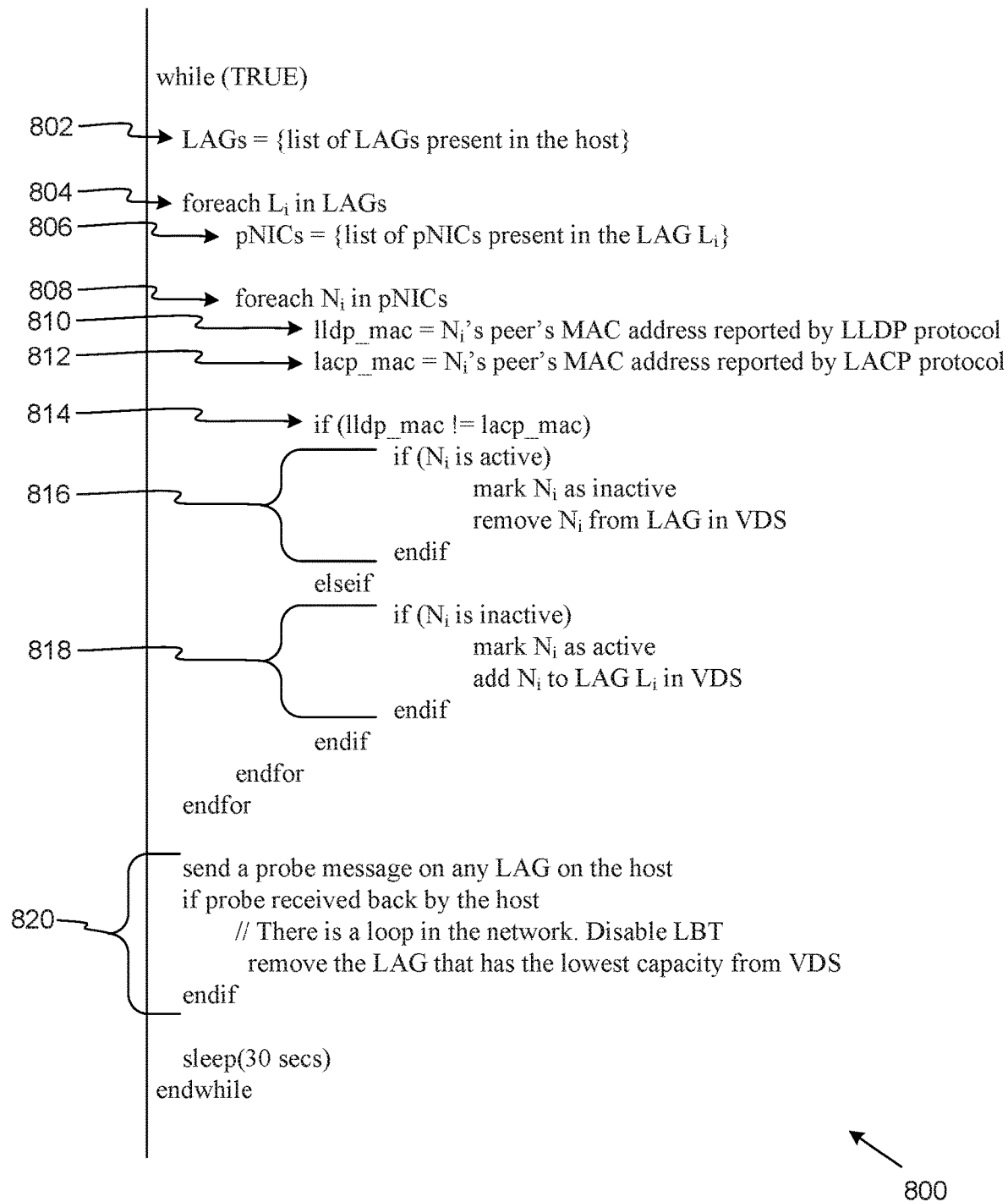
FIG. 8 is example pseudocode representative of machine-readable instructions that may be executed to implement the example network configuration manager of FIGS. 1, 3, and/or 4 to create and manage LBT over LAG network topologies.

FIG. 8 is example pseudocode 800 representative of machine-readable instructions that may be executed to implement the example network configuration manager 126 of FIGS. 1, 3, and 4 to create and manage LBT over LAG network topologies (e.g., the LBT over LAG network configuration 100 of FIG. 1 and/or any other LBT over LAG network topology implemented in accordance with the teachings of this disclosure). For example, the programming statements represented by the example pseudocode 800 may be executed by a processor such as the processor 912 of FIG. 9 to implement the example network configuration manager 126. The example pseudocode 800 includes a number of programming statements described below. Each programming statement is representative of one or more machine-readable instructions to implement the operation(s) of that programming statement.

In the example pseudocode 800, an example LAG identifying programming statement 802 is to generate a list of active LAGs in a host (e.g., the LAGs 102a,b in the host 104a). An example LAG analysis loop statement 804 is to start a loop to analyze the pNICs in each identified LAG ($L_i$). An example pNIC identifying programming statement 806 is to generate a list of pNICs for a LAG ($L_i$) currently being analyzed. An example pNIC analysis loop statement 808 is to start a loop to determine whether each pNIC ($N_i$) should be active or inactive. An example link layer discovery protocol (LLDP) MAC address discovery programming statement 810 is to determine a list of LLDP-reported MAC addresses of pNIC peers reported by an LLDP protocol. The LLDP protocol is a networking protocol used by switches and hosts to detect MAC addresses of neighboring devices. An example link aggregation control protocol (LACP) MAC address discovery programming statement 812 is to determine a list of LACP-reported MAC addresses of pNIC peers reported by an LACP protocol. The LACP protocol is a networking protocol used by switches and hosts to identify LAG members, which includes exchanging MAC addresses between the switches and hosts.

An example MAC address compare-based loop statement 814 is to start a loop to activate and/or inactivate pNIC ($N_i$) connections when the list of LLDP-reported MAC addresses does not match the list of LACP-reported MAC addresses. By comparing a neighbor's MAC address received via LLDP and LACP, the comparison process can be used to determine if all members of a LAG are connected between the same two devices. For example, referring to the second example invalid LBT over LAG network topology 508, the prober 406 (FIG. 4) can send an LLDP message for receipt by the ToR A switch 106a and the ToR B switch 106b and an LACP message for receipt by the host 104a (e.g., by the VDS 116 of FIG. 1 in the host 104a). The prober 406 receives an LLDP response message from the ToR A switch 106a that includes a MAC address of the ToR A switch 106a (e.g., MAC_TOR_A) for the first link 504a connected to the host 104a and the ToR A switch 106a, and receives an LLDP response message from the ToR B switch 106b that includes a MAC address of the ToR B switch 106b (e.g., MAC_TOR_B) for the second link 504b connected to the host 104a and the ToR B switch 106b. The prober 406 also receives an LACP response message from the VDS 116 indicating that the host 104a includes a LAG configuration that assigns the MAC address of the ToR A switch 106a (e.g., MAC_TOR_A) to both of the first and second links 504a,b. In this example, the LLDP response message and the LACP response message report different MAC addresses for the second link 504b which is indicative of an invalid LAG (e.g., the first LAG 102a of FIG. 5). The example MAC address compare-based loop statement 814 is provided in the example of FIG. 8 to detect invalid LAG configurations based on determining when the list of LLDP-reported MAC addresses does not match the list of LACP-reported MAC addresses on a per-LAG basis. An example pNIC ($N_i$) inactivate programming statement 816 is to inactivate or disconnect pNICs from LAGs when such pNICs are active but should be inactive. An example pNIC ($N_i$) activate programming statement 818 is to activate or connect pNICs to LAGs for load balancing purposes based on an LBT load balancing policy. An example invalid connection check programming statement 820 is to use probe messages to check whether any invalid connections exist on any LAG that make an LBT over LAG network topology invalid. The example programming statements of the pseudocode 800 may be repeated one or more times based on a while loop and may be ended when LBT over LAG monitoring should be ended such as when a VDS (e.g., the VDS 116 of FIG. 1 and/or the VDS 320 of FIG. 3) and/or a VRM (e.g., the VRM 225, 227 of FIGS. 2 and 3) is/are shutdown or made inactive.

Figure 9:
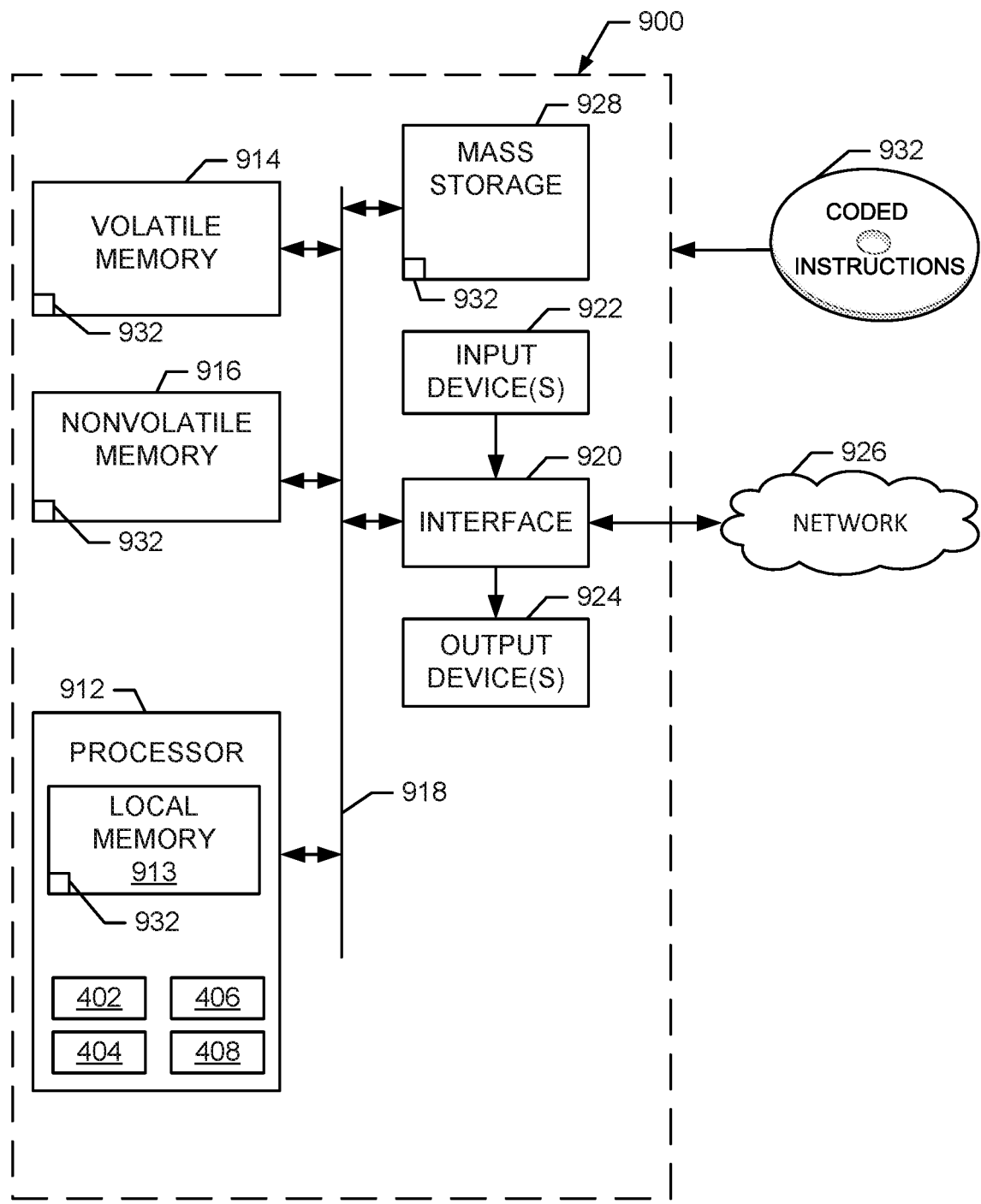
FIG. 9 is a block diagram of an example processor platform structured to execute the machine-readable instructions represented in FIGS. 6-8 to implement the network configuration manager of FIGS. 1, 3, and/or 4 to create and manage LBT over LAG network topologies.

FIG. 9 is a block diagram of an example processor platform 900 structured to execute the instructions of FIGS. 6-8 to implement the network configuration manager 126 of FIGS. 1, 3, and 4. The processor platform 900 can be, for example, a server, a personal computer, a workstation, a self-learning machine (e.g., a neural network), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the link aggregator 402, the link manager 404, the prober 406, and the notifier 408 of FIG. 4.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

Example machine executable instructions 932 representative of the machine-readable instructions of FIGS. 6-8 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed to enable using both LBT policies and LAG methods together to increase availability and throughput of network resources and overcome the problems associated with prior implementations that require using LBT policies and LAG methods in mutually exclusive manners. In prior implementations of LBT policies and LAG methods, customers of virtualization services and administrators must select to implement only one of LBT or LAG and maintain the selected implementation because it is nearly impractical to switch between the two due to the significant overhead required to reconfigure cabling in the physical network. Examples disclosed herein provide an example LBT over LAG network architecture that enables using both LBT policies and LAG methods simultaneously. Example LBT over LAG techniques disclosed herein can be used to dynamically create different LBT over LAG topologies to adjust for different network conditions. In such LBT over LAG topologies, attributes of the LAG method can be used to increase network throughput available from a single dvport by binding the single dvport to multiple pNICs. In this manner, LAG attributes can be leveraged to use the multiple pNICs simultaneously to serve the single dvport in a more effective manner than is possible using prior implementations of the LBT policy. In addition, attributes of the LBT policy can be used to load balance network traffic across multiple ToR switches by connecting a LAG assigned to multiple pNICs between a dvport and another ToR switch different from a ToR switch that is occupied by one or more other dvports. Using the example LBT over LAG network architecture disclosed herein, the LBT policy can also be used to establish a dvport assigned to a single pNIC so that load balancing attributes of the LBT policy can still be employed by MPIO-based storage devices that are only capable of communicating through one pNIC at a time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to manage network resources, the apparatus comprising:
   a link aggregator to:
      aggregate a first plurality of physical network interface cards to create a first link aggregated group, the first link aggregated group corresponding to a first virtual network interface card; and
      aggregate a second plurality of physical network interface cards to create a second link aggregated group, the second link aggregated group corresponding to a second virtual network interface card; and
   a link manager to:
      connect the first link aggregated group between a first distributed virtual port and a first top-of-rack switch;
      connect the second link aggregated group between a second distributed virtual port and a second top-of-rack switch;
      remove a first invalid connection that is active and directly between the first plurality of physical network interface cards and the second top-of-rack switch;
      detect a second invalid connection corresponding to the first and second link aggregated groups, the second invalid connection based on the first top-of-rack switch being connected to the second top-of-rack switch; and
      correct the second invalid connection by removing the second link aggregated group, at least one of the link aggregator or the link manager to include circuitry.

2. The apparatus as defined in claim 1, wherein the link manager is to remove the first invalid connection between the first plurality of physical network interface cards and the second top-of-rack switch while maintaining the first link aggregated group connected between the first distributed virtual port and the first top-of-rack switch and maintaining the second link aggregated group connected between the second distributed virtual port and the second top-of-rack switch.

3. The apparatus as defined in claim 1, wherein the first and second virtual network interface cards are accessible via distributed virtual ports of a virtual network distributed switch by applications executing in a virtual machine on a host server to communicate via a network.

4. The apparatus as defined in claim 1, wherein the link manager is further to reconnect the second link aggregated group between the second distributed virtual port and the second top-of-rack switch after the first top-of-rack switch is disconnected from the second top-of-rack switch.

5. The apparatus as defined in claim 1, wherein the link manager is further to:
   detect a third invalid connection between the second plurality of physical network interface cards and the first top-of-rack switch; and remove the third invalid connection between the second plurality of physical network interface cards and the first top-of-rack switch.

6. The apparatus as defined in claim 1, wherein the link manager is to connect the second link aggregated group between the second distributed virtual port and the second top-of-rack switch based on a utilization of the first link aggregated group satisfying a threshold.

7. The apparatus as defined in claim 1, wherein the first and second pluralities of physical network interface cards correspond to a same physical host.

8. The apparatus as defined in claim 1, further including a virtual network distributed switch to implement the link aggregator and the link manager.

9. The apparatus as defined in claim 1, further including a software defined data center manager to implement the link aggregator and the link manager.

10. An apparatus to manage network resources, the apparatus comprising:
   means for forming link aggregated groups by:
      aggregating a first plurality of physical network interface cards to form a first link aggregated group, the first link aggregated group corresponding to a first virtual network interface card; and
      aggregating a second plurality of physical network interface cards to form a second link aggregated group, the second link aggregated group corresponding to a second virtual network interface card; and
   means for managing configurations of link aggregated groups for use in routing based on network interface card load by:
      connecting the first link aggregated group between a first distributed virtual port and a first top-of-rack switch;
      connecting the second link aggregated group between a second distributed virtual port and a second top-of-rack switch;
      removing a first invalid connection that is active and directly between the first plurality of physical network interface cards and the second top-of-rack switch;
      detecting a second invalid connection corresponding to the first and second link aggregated groups, the second invalid connection based on the first top-of-rack switch being connected to the second top-of-rack switch; and
      correcting the second invalid connection by removing the second link aggregated group.

11. The apparatus as defined in claim 10, wherein the means for managing configurations of link aggregated groups is to remove the first invalid connection between the first plurality of physical network interface cards and the second top-of-rack switch while maintaining the first link aggregated group connected between the first distributed virtual port and the first top-of-rack switch and maintaining the second link aggregated group connected between the second distributed virtual port and the second top-of-rack switch.

12. The apparatus as defined in claim 10, wherein the first and second virtual network interface cards are accessible by applications executing in a virtual machine on a host server to communicate via a network.

13. The apparatus as defined in claim 10, wherein the means for managing configurations of link aggregated groups is to connect the second link aggregated group between the second distributed virtual port and the second top-of-rack switch based on a bandwidth utilization of the first link aggregated group satisfying a threshold.

14. A non-transitory computer readable storage medium comprising instructions that, when executed, cause at least one processor to:
   aggregate a first plurality of physical network interface cards to create a first link aggregated group, the first link aggregated group corresponding to a first virtual network interface card;
   aggregate a second plurality of physical network interface cards to create a second link aggregated group, the second link aggregated group corresponding to a second virtual network interface card;
   connect the first link aggregated group between a first distributed virtual port and a first top-of-rack switch;
   connect the second link aggregated group between a second distributed virtual port and a second top-of-rack switch;
   remove a first invalid connection that is active and directly between the first plurality of physical network interface cards and the second top-of-rack switch;
   detect a second invalid connection corresponding to the first and second link aggregated groups, the second invalid connection based on the first top-of-rack switch being connected to the second top-of-rack switch; and
   correct the second invalid connection by removing the second link aggregated group.

15. The non-transitory computer readable storage medium as defined in claim 14, wherein the instructions are to cause the at least one processor to remove the first invalid connection between the first plurality of physical network interface cards and the second top-of-rack switch while maintaining the first link aggregated group connected between the first distributed virtual port and the first top-of-rack switch and maintaining the second link aggregated group connected between the second distributed virtual port and the second top-of-rack switch.

16. The non-transitory computer readable storage medium as defined in claim 14, wherein the first and second virtual network interface cards are accessible via distributed virtual ports of a virtual network distributed switch by applications executing in a virtual machine on a host server to communicate via a network.

17. The non-transitory computer readable storage medium as defined in claim 14, wherein the instructions are further to cause the at least one processor to reconnect the second link aggregated group between the second distributed virtual port and the second top-of-rack switch after the first top-of-rack switch is disconnected from the second top-of-rack switch.

18. The non-transitory computer readable storage medium as defined in claim 14, wherein the instructions are further to cause the at least one processor to:
   detect a third invalid connection between the second plurality of physical network interface cards and the first top-of-rack switch; and
   remove the third invalid connection between the second plurality of physical network interface cards and the first top-of-rack switch.

19. The non-transitory computer readable storage medium as defined in claim 14, wherein the instructions are to cause the at least one processor to connect the second link aggregated group between the second distributed virtual port and the second top-of-rack switch based on a utilization of the first link aggregated group satisfying a threshold.

20. The non-transitory computer readable storage medium as defined in claim 14, wherein the first and second pluralities of physical network interface cards correspond to a same physical host.

21. The apparatus as defined in claim 10, wherein the means for managing configurations of link aggregated groups is further to:
    detect a third invalid connection between the second plurality of physical network interface cards and the first top-of-rack switch; and
    remove the third invalid connection between the second plurality of physical network interface cards and the first top-of-rack switch.

22. A method to manage network resources, the method comprising:
    aggregating, by executing an instruction with at least one processor, a first plurality of physical network interface cards to create a first link aggregated group, the first link aggregated group corresponding to a first virtual network interface card;
    aggregating, by executing an instruction with the at least one processor, a second plurality of physical network interface cards to create a second link aggregated group, the second link aggregated group corresponding to a second virtual network interface card;
    connecting, by executing an instruction with the at least one processor, the first link aggregated group between a first distributed virtual port and a first top-of-rack switch;
    connecting, by executing an instruction with the at least one processor, the second link aggregated group between a second distributed virtual port and a second top-of-rack switch;
    removing, by executing an instruction with the at least one processor, a first invalid connection that is active and directly between the first plurality of physical network interface cards and the second top-of-rack switch based on sending a probe message via the first link aggregated group;
    detecting, by executing an instruction with the at least one processor, a second invalid connection corresponding to the first and second link aggregated groups, the second invalid connection based on the first top-of-rack switch being connected to the second top-of-rack switch; and
    correcting, by executing an instruction with the at least one processor, the second invalid connection by removing the second link aggregated group.

23. The method as defined in claim 22, further including, after the removing of the first invalid connection between the first plurality of physical network interface cards and the second top-of-rack switch:
    maintaining the first link aggregated group connected between the first distributed virtual port and the first top-of-rack switch; and
    maintaining the second link aggregated group connected between the second distributed virtual port and the second top-of-rack switch.

24. The method as defined in claim 22, wherein the first and second virtual network interface cards are accessible via distributed virtual ports of a virtual network distributed switch by applications executing in a virtual machine on a host server to communicate via a network.

25. The method as defined in claim 22, further including reconnecting the second link aggregated group between the second distributed virtual port and the second top-of-rack switch after the first top-of-rack switch is disconnected from the second top-of-rack switch.

26. The method as defined in claim 22, further including:
    detecting a third invalid connection between the second plurality of physical network interface cards and the first top-of-rack switch; and
    removing the third invalid connection between the second plurality of physical network interface cards and the first top-of-rack switch.

27. The method as defined in claim 22, wherein the connecting of the second link aggregated group between the second distributed virtual port and the second top-of-rack switch is based on a utilization of the first link aggregated group satisfying a threshold.

28. The method as defined in claim 22, wherein the first and second pluralities of physical network interface cards correspond to a same physical host.

29. The apparatus as defined in claim 1, wherein the link manager is to send a probe message via the first link aggregated group, and remove the first invalid connection in response to the probe message being rerouted back through the first link aggregated group.

30. The apparatus as defined in claim 10, wherein the means for managing configurations of link aggregated groups is to send a probe message via the first link aggregated group, and remove the first invalid connection in response to the probe message being rerouted back through the first link aggregated group.

31. The non-transitory computer readable storage medium as defined in claim 14, wherein the instructions are to cause the at least one processor to send a probe message via the first link aggregated group, and remove the first invalid connection in response to the probe message being rerouted back through the first link aggregated group.

32. The apparatus as defined in claim 1, wherein the first invalid connection is a cause of a routing loop in which packets are repeatedly routed between network devices.

33. The apparatus as defined in claim 10, wherein the first invalid connection is to cause a routing error associated with a routing loop.

34. The non-transitory computer readable storage medium as defined in claim 14, wherein the first invalid connection is a cause of a routing loop in which packets are repeatedly routed between network devices.

35. The method as defined in claim 22, wherein the removing of the first invalid connection is in response to routing of the probe message in a loop back through the first link aggregated group.

36. The apparatus as defined in claim 10, wherein the means for managing configurations of link aggregated groups is further to reconnect the second link aggregated group between the second distributed virtual port and the second top-of-rack switch after the first top-of-rack switch is disconnected from the second top-of-rack switch.

\* \* \* \* \*